June 11, 1940.     J. A. MARTIN     2,204,507
SEALING RING
Filed May 4, 1940
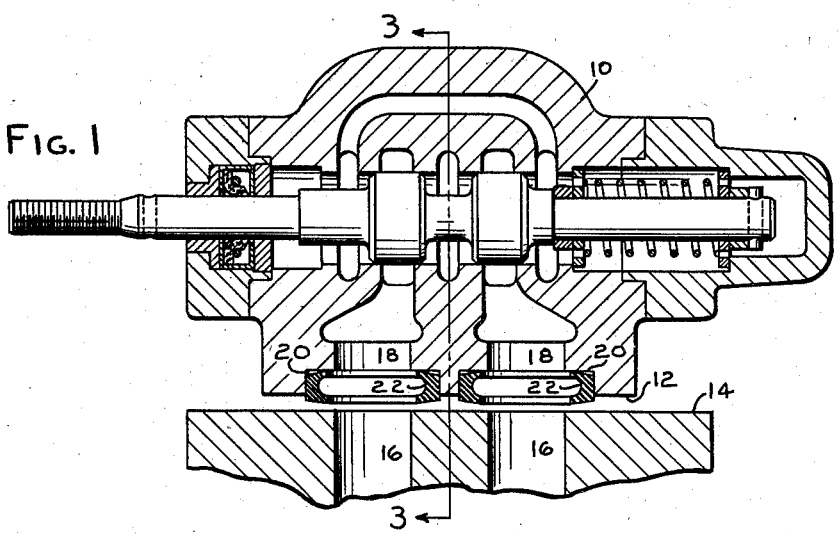
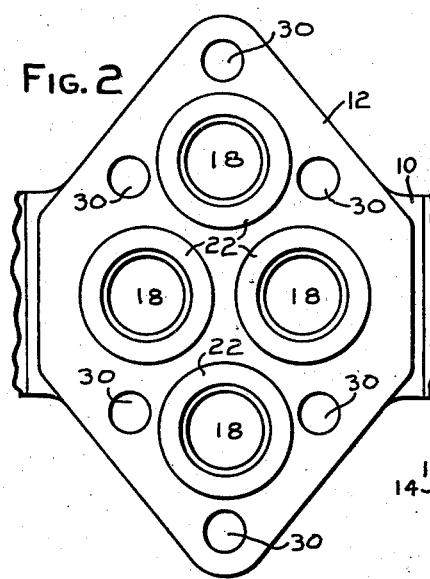
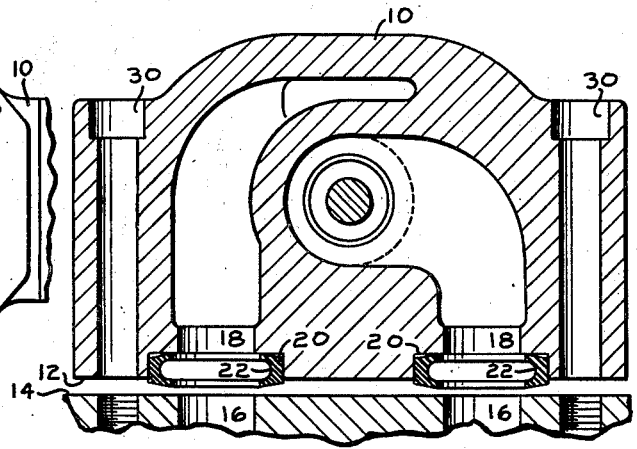
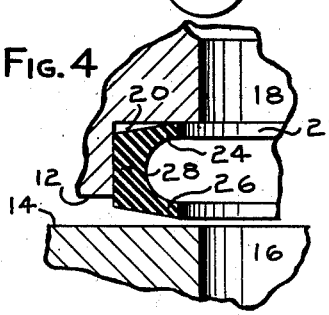
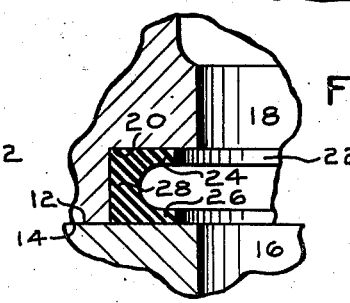
*INVENTOR*
JOSEPH A. MARTIN
BY
*ATTORNEY*

Patented June 11, 1940

2,204,507

UNITED STATES PATENT OFFICE 2,204,507

SEALING RING

Joseph A. Martin, Detroit, Mich., assignor to Vickers Incorporated, Detroit, Mich., a corporation of Michigan Application May 4, 1940, Serial No. 333,435

1 Claim. (Cl. 288—14)

This application is a continuation in part of my copending application, Serial No. 323,342, filed March 11, 1940, for Sealing ring, which latter application has been abandoned.

The present invention is concerned with a conduit joint for use with either single or multiple conduits contained in two members adapted to be assembled together in abutting relation. Power transmission systems using oil as a fluid medium have come into extensive use in recent years, and many such systems operate at very high oil pressures of the order of two to three thousand pounds per square inch. Improvements in the design of the pumps, motors and valves which go to make up such systems have permitted increasingly higher pressures to be utilized. Many systems in use today are of a somewhat complex nature as regards their circuits and require a large number of pipe connections between the various units of the system, which connections are subjected to these extremely high pressures.

It is desirable to reduce to the minimum the number of conduit connections which are used in a given power transmission system, and for this purpose, it is becoming increasingly common to utilize valves and other control units of the so-called flange-mounted type. Units of this type have all of their circuit connections brought out to a single flat surface which may be mounted by means of a gasket against a flat mounting surface having corresponding conduits therein registering with the conduits in the control unit. One of the difficulties experienced with this type of construction is that of insuring a leak-proof seal at the gasket between the control unit and the mounting surface. Since it frequently occurs that the control unit is manufactured by a different manufacturer than the one who manufactures the mounting surface, as, for example, one upon the frame of a machine tool, leaks due to irregularities in the mounting surface are frequent. In addition, leaks due to warpage under the high pressures exerted in the conduits are frequent unless careful attention is paid to the arrangment of the mounting bolts which hold the parts together. In order to satisfactorily insure against such warpage it is necessary to completely surround each conduit with a circle of bolts which unnecessarily complicate the construction and greatly detract from the advantages of the so-called flange-mounted construction.

It is an object of the present invention to provide an improved conduit joint particularly suited for use in multiple conduit installations as well as in single conduit joints having an improved sealing member formed of a material having the resilient characteristics of rubber and which provides a tight seal both at low and high pressures and under fluctuating pressure.

A further object is to provide a conduit joint construction of the character described which may be used in multiple conduit joints and permits of fewer and smaller mounting bolts and which will maintain a seal regardless of roughness of the mounting seal or of warpage of the metallic members of the conduit joint.

A further object is to provide in a conduit joint of the character described a sealing ring formed of material having the resilient characteristics of rubber and resistant to the fluid being sealed and which is of sufficient resilience to permit the thin flexible lip portions of the ring to deflect as necessary in operation of the seal and which is yet hard enough to avoid any plastic flow of the sealing ring material through cracks between adjacent joint members.

Further objects and advantages of the present invention will be apparent from the following description, reference being had to the accompanying drawing wherein a preferred form of the present invention is clearly shown.

In the drawing:

Figure 1 is a longitudinal cross section of a flange-mounted valve utilizing a conduit joint construction embodying a preferred form of the present invention.

Figure 2 is a bottom view of the valve illustrated in Figure 1.

Figure 3 is a cross section on line 3—3 of Figure 1.

Figure 4 is an enlarged fragmentary cross section of the sealing ring construction illustrated in Figure 1 before the parts have been drawn into final assembled relationship.

Figure 5 is a view corresponding to Figure 4 showing the parts drawn together.

Referring now to Figure 1, there is shown a four-way valve having a body 10 of conventional construction so far as the valve itself is concerned. The lower portion of the valve body has a flat surface 12 of diamond shape, as illustrated in Figure 2, which is adapted to be mounted in abutting relationship with a flat mounting surface 14 which forms a support for the valve as well as a medium through which the various hydraulic conduits with which the valve body connects may be carried. In the present example there are illustrated four such conduits, one portion 16 of each lying in the mounting member 14 and the other portion 18 of each lying in the valve body 10. Since the sealing construction at each conduit is identical, only one will be described.

At the mouth of each conduit portion 18 there is formed a recess 20 surrounding such conduit portion and of generally rectangular form in cross section, as viewed in Figures 1 and 4. Mounted in each recess 20 is a sealing ring 22 formed of Neoprene or other similar substance having the resilient characteristics of rubber and resistant to the fluid medium which is carried by the power transmission system. The Neoprene or other resilient material of which the ring is formed is of a semi-hard composition sufficiently hard to resist plastic flow under extremely high pressures but yet not so hard as to prevent flexing of the lip parts thereof hereafter described. Preferably the material has a durometer hardness in the range of approximately 65 to 85.

The sealing ring is formed by molding to a shape as illustrated in Figure 4. Thus the ring may comprise two similar generally flat lip portions 24 and 26 which extend radially inward toward the axis of the conduit portions 16 and 18. These lip portions in the unstressed condition of the sealing ring lie in planes divergent from one another at their inner peripheries so that the overall thickness of the sealing ring at its inner periphery is substantially greater than the axial depth of the recess 20. The two lip portions are joined together by a base portion 28, and the inner surface of the lips and base is formed as an arc to present the generally U-shaped figuration appearing in Figure 4. The total depth or thickness of the sealing ring at its outer periphery, that is, at the base 28, is preferably equal to or slightly less than the axial depth of the recess 20. The outer periphery of the base portion is also preferably equal to or slightly less than the outer periphery of the recess 20.

When the valve body 10 is mounted to the surface 14 with the sealing rings 22 interposed in the recesses 20, the mounting bolts, not shown, which may be provided at the holes 30 are drawn up to bring the body 10 with its surface 12 into snug engagement with the surface 14, it being unnecessary to draw the bolts down as tightly as is common practice when bolting together two gasketed members. The appearance of the sealing ring when the parts are thus drawn together is shown in Figure 5 from which it will be seen that the two lip portions 24 and 26 have been flexed axially toward one another so that the sealing ring substantially fills the recess.

It will be noted that, with the parts thus assembled, the inner edges of the lips 24 and 26 are initially compressed so that they maintain a tight engagement between the surface 14 and with the bottom of the recess 20. This tight engagement at the very inner corner of each lip acts to maintain a tight seal under conditions when the pressure within the conduit portion is low or atmospheric. In addition, when pressure builds up in the conduit, the pressure is excluded from the surface between the outside of the sealing ring and the adjoining metal surfaces so that the pressure reacts on the inner U-shaped surface of the sealing ring to press the lips 24 and 26 in tighter engagement with their coacting metal surfaces. Thus, the higher the pressure builds up, the tighter are the sealing lips pressed into engagement with the recess 20 and with the flat surface 14.

This construction provides many superior advantages over previous constructions used for the same purpose: It does not require that the bolts or other fastenings be drawn down to exert great compression force on the packing. In fact, joints constructed according to the present invention have been found to maintain a fluid-pressure tight seal when the fastening means have been only drawn up finger tight and to hold the seal against pressures of many thousand pounds per square inch. Another important advantage is that the mounting bolts, which are used as a fastening means, can be smaller and, more important, can be much wider spaced than is permissible with gasketed joints of the prior art. This is due to the fact that where warpage or deflection occurs under the stresses of high fluid pressure the tightness of the seal is not affected because the sealing rings, being flexible and being constantly urged by hydraulic pressure against the contacting surfaces at the bottom of the recess and at the mounting surface, are caused to follow any warpage or deflecting movement of either part. This feature has permitted constructions, such as the present flange-mounted four-way valve, which were previously impossible because of inability to find sufficient space to locate the necessary mounting bolts when a gasket of conventional form was used.

Still another advantage arises from the fact that the fluid-tight seal is maintained at points close to the periphery of the conduits themselves so that when spreading or warping of parts occurs no opportunity is afforded for pressure oil to escape between the joint surfaces of the two members and thus creates additional spreading forces due to the fluid pressure between the surfaces 12 and 14. In this way the warpage which takes place is greatly reduced over that occurring with a gasketed construction, and this contributes additionally toward reducing the size and number of mounting bolts required.

Still a further advantage arises from the fact that, because the mounting bolts do not have to be drawn down with a high degree of tightness, warpage in the valve body 10 is reduced, and additionally, if the mounting bolts are drawn down tight, there are no bending forces set up at the surface 12 which tend to warp the body 10 in such a manner as to cause the valve spool to bind in its bore. This difficulty has been very important with prior art constructions, particularly those of the so-called Vogt flange type which use a small soft metal gasket compressed in a recess to a high degree of compression and wherein the surfaces corresponding to the surfaces 12 and 14 do not normally come into contact with one another when the bolts are drawn down to their full tightness.

In contrast to this the present construction permits the two members to be brought into flat abutment at the surfaces 12 and 14 across the entire extent of these surfaces, and thus, when the mounting bolts are drawn down tightly, no warping forces are set up in the body 10 which might tend to bind the spool of the valve in its bore.

While the form of embodiment of the invention as herein disclosed constitutes a preferred form, it is to be understood that other forms might be adopted, all coming within the scope of the claim which follows.

What is claimed is as follows:

A sealing ring for use in a conduit joint of the class having two flange-like members adapted to be brought into direct contact and providing an annular recess surrounding the conduit at the juncture between the flange-like members, said ring being formed throughout of a material having the resilient characteristics of rubber having a hardness of between 65 and 85 durometer and shaped to provide when unstressed before assembly a cylindrical face at one side, end faces substantially in the form of an obtuse truncated cone and at the other side a face of generally hollowed out form to provide divergent radially extending lip portions adapted to be deflected toward each other when assembled in the joint and thus maintain tight contact with said members at the periphery of the truncated conical surfaces.

JOSEPH A. MARTIN.